Patented July 27, 1943

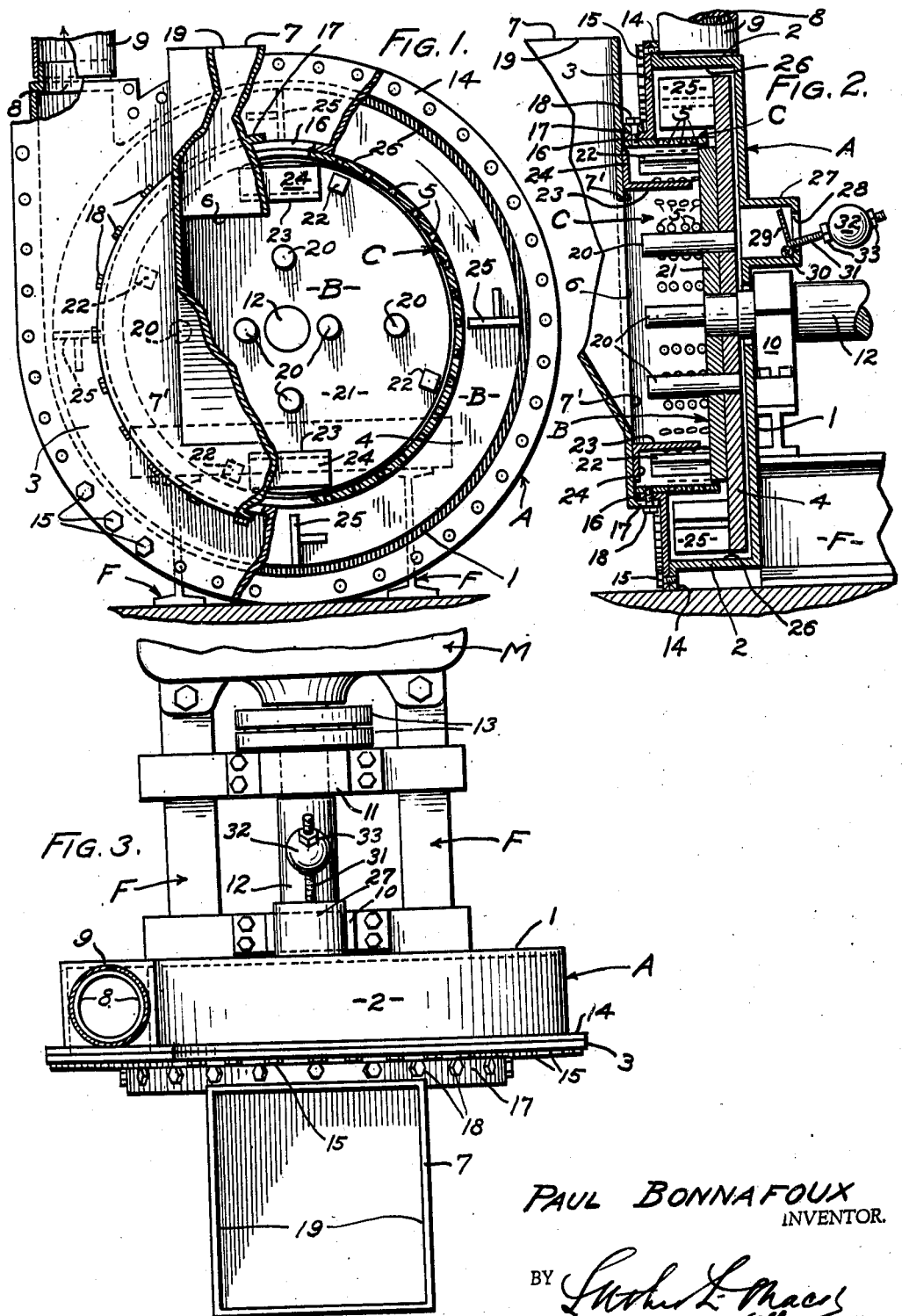

2,325,101

UNITED STATES PATENT OFFICE 2,325,101

HAY BREAKER

Paul Bonnafoux, Lancaster, Calif.

Application May 16, 1941, Serial No. 393,753

2 Claims. (Cl. 83—11)

This invention relates to and has for an object the provision of an improved type of hay breaker, sometimes referred to as a pulverizer or grinder by means of which dry hay is fed to the center of a rapidly rotating mill enclosed in a suitable housing and adapted to grind or pulverize the hay and from which the ground material is delivered peripherally for use.

I am aware that other mills have been heretofore used for substantially the same purpose but I have ascertained that for several reasons mills now in use are prone to become clogged because of a failure to completely break up the hay into sufficiently fine particles capable of delivery from the mill, and additionally, the suction or forced draft employed for inducing a flow of the material into and from the mill is inefficient due to an improper arrangement of the internal parts of the mill.

My invention comprehends the provision of a mill which has an axially disposed feed for delivering the fibrous material into the center of a rapidly rotating element which is provided with pins or projections disposed parallel to the axis thereof, a screen with orifices arranged in sufficient number and of suitable size for moving the broken particles therethrough, and a fan outwardly of the screen for inducing a constant flow of the ground materials into an outer annular chamber which is connected with an eccentrically disposed outlet from which the material is delivered for use.

An object of the invention is to provide stationary members interiorly of the screen which combine with the rotatable pins or projections on the rotor to break up the strands of hay into fine particles and assure the expulsion of said particles through the screen into the annular induced draft passage or chamber, so as to reduce if not actually eliminate the possibility of clogging the rotor with unexpelled material.

A further object is to provide a mill for pulverizing hay which is simple in its structural arrangement, economical and which has a maximum of efficiency. Other objects may appear as the description progresses.

I have shown a preferred form of mill embodying my improvements in the accompanying drawing, subject to modification, within the scope of the appended claims, without departing from the spirit of my invention.

In said drawing:

Fig. 1 is a side elevation of the mill, partly in section;

Fig. 2 is a central vertical sectional elevation thereof;

Fig. 3 is a top plan view, showing the connection with the mill of a motor and suitable driving connections.

Briefly described, the mill of my invention includes a metal housing A of cylindrical form having a rear wall 1, a circular wall 2 and a front wall 3 within which is rotatably mounted a rotor B having a back 4 but slightly spaced from wall 1 and a stationary annular screen C with a plurality of perforations 5 of suitable size and number extending entirely around the screen.

Housing A has an enlarged central opening 6 which is covered by the mouth of a feed hopper 7 and an outlet 8 which is tangentially disposed relative to the axis of the housing and may be connected with a pipe 9 for conveying the products of the mill outwardly to points of usage and disposition. Said housing is adapted to be suitably mounted on a fabricated frame F which may also support bearings 10 and 11 for a driving shaft 12 which is coupled by a suitable means 13 to the shaft of a motor M, and preferably directly connected with said motor for providing rapid rotation of the rotor B.

The front 3 is preferably separately formed so as to overlie an annular flange 14 formed on housing A and to which it is attached as by means of bolts 15. Member 3 also has an annular flange 16 which is telescoped by a flange 17 on hopper 7 and said flanges are connected as by means of bolts 18. Hopper 7 has a mouth 19 at the top of the machine adapted to receive materials to be treated by the machine.

Screen C is also of annular form and is held in operating position by means of bolts 18 with its rear edge abutting the web 4 of rotor B. Said rotor has a plurality of round pins 20 attached to web 4 and extending on parallel axes from said web in the direction of the hopper 7 and through a plate 21 which abuts web 4 and rotates therewith. Said plate 21 slightly telescopes screen C so as to insure the exhaust of the material through the screen only. Rotor B also is provided with a plurality of square or faceted pins 22 at points very close to the inner surface of screen C tend to grind or break up the material into fine particles during the operation of the machine, the grinding operation being facilitated in cooperation with a pair or more of fixed plates 23 which have right angular portions 24 welded to the wall 7' of the hopper, the grinding pins 22 thereby are rotatable between the screen C and the outer surfaces of the plates 23 so as to completely break up the strands of hay into fine particles which may be expelled through the orifices of the screen.

Intermediate the screen C and the annular wall 2 of the housing A I provide a plurality of fan blades 25 of suitable cross section which are attached by welding or otherwise to the web 4 of the rotor and rapidly rotate in an annular air chamber 26 between the screen and wall 2 for the purpose of providing an induced draft in said chamber and in the space within the screen for expelling the ground particles of material through the orifices of the screen and thence outwardly from chamber 26 through the outlet 8 and pipe 9 for ultimate disposition.

Housing A has a rearwardly projecting extension 27 with an opening 28 in the end thereof which is adapted to be covered by an automatically operable valve 29 which is pivoted at 30 on the housing and has an arm 31 on the rear portion of which is a weight 32 adapted to be adjustably held in position on said arm by means of one or more lock nuts 33. Said weight operates to hold the valve 29 closed until the suction built up in the annular chamber 26 is sufficient to open the valve against the pull of weight 32, in which case air is introduced into said chamber through the extension 27 and the air space between the web 4 and the rear wall 1 of the housing.

I am aware that other devices for a similar purpose have been used but such devices depend upon the suction within the area defined by the screen to exhaust the pulverized material from the mill and should the mill become clogged with wet hay the breaking up process is prevented or retarded to the extent that air cannot be drawn through the mill and as a consequence the material cannot be expelled.

I have overcome the above mentioned difficulties by the provision of the annular draft chamber 26 externally of the screen and the stationary plates 23 between which and the screen the material is forced when the mill is in operation for producing a grinding effect instead of merely a breaking up of the hay by reason of the action of the internal pins. Moreover, in mills for this purpose heretofore known the screen is usually semi-cylindrical and is positioned opposite the mouth of the discharge 8. Hence, the only opportunity for the expulsion of the broken up material is through but a segment of a screen. In my improved mill with the annular air chamber 26 extending entirely around the screen and the screen being circular, a greater area is provided for the expulsion of the materials than is possible in other devices now in use and the air chamber 26 at all times having an uninterrupted suction, the materials readily flow from the interior of the screen and therethrough to said chamber and are expelled by the draft therein through pipe 9 for use.

The provision of the automatically operable valve 29 at the rear of the housing provided a free air inlet should the interior of the mill for any reason become congested sufficiently to impair the operation of the machine and the suction cannot at any time become diminished to an appreciable extent. The adjustment of weight 32 on arm 31 adapts the valve 29 to modified conditions of use and of course increases or decreases the effort required to operate the valve.

In operation, the material is deposited in the hopper 7 and when rotor is operating at a high speed through power supplied from a source, as for instance, the motor M, the stranded dry hay is drawn into the center of the rotor by suction created in the chamber 26 and is engaged and initially broken up into fine particles by the pins 20. As the material thus initially treated is moved outwardly by centrifugal force and suction the material is further subjected to the grinding action of the pins 22, and the plates 23 immediately adjacent the inner surface of the screen C and the resultant particles are readily dispersed through the orifices 5 of the screen into chamber 26 and through and from said chamber outwardly for use through pipe 9.

What I claim is:

1. A pulverizing mill comprising: a cylindrical housing with an axially disposed inlet for material, a rotor in said housing, an annular screen stationarily held on the front of said housing and telescoping a portion of said rotor whereby to provide a milling chamber internally of said screen and an annular suction chamber externally of said screen, blades carried by said rotor and rotatable in said suction chamber, and a plurality of pulverizing elements carried by said rotor at different distances from the axis thereof and rotatable within said milling chamber, said suction chamber having an outlet whereby the pulverized material may be exhausted from the milling chamber through said screen, said suction chamber and said outlet, said mill including an air inlet on the back of said housing, a valve pivotally mounted adjacent and adapted to normally close said inlet against admission of air, and means for affording communication between said air inlet and said suction chamber without admitting air to the milling chamber.

2. A pulverizing mill as characterized in claim 1 including: a weight adjustably attached to said valve for regulating the operation of the valve in accordance with requirements for use.

PAUL BONNAFOUX.